United States Patent
Lin et al.

(10) Patent No.: US 12,511,842 B2
(45) Date of Patent: Dec. 30, 2025

(54) SHOE TRY-ON METHOD AND APPARATUS BASED ON AUGMENTED REALITY, AND ELECTRONIC DEVICE

(71) Applicant: BEIJING ZITIAO NETWORK TECHNOLOGY CO., LTD., Beijing (CN)

(72) Inventors: Gaojie Lin, Beijing (CN); Yuxuan Luo, Beijing (CN); Yongming Zhu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 176 days.

(21) Appl. No.: 18/280,916

(22) PCT Filed: Mar. 4, 2022

(86) PCT No.: PCT/CN2022/079273
§ 371 (c)(1),
(2) Date: Sep. 7, 2023

(87) PCT Pub. No.: WO2022/188708
PCT Pub. Date: Sep. 15, 2022

(65) Prior Publication Data
US 2024/0153216 A1    May 9, 2024

(30) Foreign Application Priority Data
Mar. 11, 2021  (CN) .......................... 202110273630.6

(51) Int. Cl.
*G06T 19/00* (2011.01)
*G06V 10/25* (2022.01)
*G06V 10/26* (2022.01)

(52) U.S. Cl.
CPC ............ *G06T 19/006* (2013.01); *G06V 10/25* (2022.01); *G06V 10/26* (2022.01)

(58) Field of Classification Search
CPC ....... G06T 19/006; G06T 15/00; G06V 10/25; G06V 10/26; G06V 10/774; G06V 10/82; G06V 20/64; G06V 20/20; G06N 3/08
See application file for complete search history.

(56) References Cited

U.S. PATENT DOCUMENTS 9,460,557 B1 * 10/2016 Tran ........................ G06T 17/20
9,684,928 B2 * 6/2017 Freeman ............ G06Q 30/0643
(Continued)

FOREIGN PATENT DOCUMENTS

| CN | 110298370 A | 10/2019 |
|---|---|---|
| CN | 111369686 A | 7/2020 |

(Continued)

OTHER PUBLICATIONS

Written Opinion for International Application No. PCT/CN2022/079273, mailed May 13, 2022, 11 Pages with English translation.
(Continued)

*Primary Examiner* — Motilewa Good-Johnson
(74) *Attorney, Agent, or Firm* — BakerHostetler

(57) ABSTRACT

A shoe try-on method and apparatus based on augmented reality, and an electronic device. The method comprises: upon detecting a shoe try-on instruction, determining, according to any calf image in a real image that is collected in real time, an initial rendering area corresponding to the calf image; according to all the calf images in the real image, determining a shielding area; and then determining a target rendering area according to the shielding area and the initial rendering area. Therefore, it is only necessary to perform shoe mold rendering on the target rendering area.

17 Claims, 5 Drawing Sheets

(56) References Cited

U.S. PATENT DOCUMENTS

| | | | |
|---|---|---|---|
| 10,943,365 B2* | 3/2021 | Chu | G06T 7/73 |
| 11,900,559 B1* | 2/2024 | Li | G06T 7/73 |
| 11,978,174 B1* | 5/2024 | Li | G06N 3/08 |
| 12,100,114 B1* | 9/2024 | Karumuri | G06T 7/70 |
| 12,136,180 B1* | 11/2024 | Karumuri | G06T 7/73 |
| 12,211,090 B1* | 1/2025 | Karumuri | G06Q 30/0643 |
| 2013/0307851 A1* | 11/2013 | Hernandez | G06T 17/00 |
| | | | 345/420 |
| 2015/0199816 A1 | 7/2015 | Freeman et al. | |
| 2017/0053335 A1* | 2/2017 | Hanscom | A43D 1/027 |
| 2017/0249783 A1* | 8/2017 | Mach Shepherd | G06T 17/20 |
| 2017/0272728 A1* | 9/2017 | Rafii | G06Q 30/0631 |
| 2018/0033202 A1* | 2/2018 | Lam | G06V 40/10 |
| 2020/0000180 A1* | 1/2020 | Sherrah | A43D 1/025 |
| 2020/0065991 A1 | 2/2020 | Chu et al. | |
| 2021/0375025 A1* | 12/2021 | Yan | G06V 10/757 |
| 2022/0101417 A1* | 3/2022 | Boscolo | G06Q 30/0633 |
| 2022/0270297 A1* | 8/2022 | Koh | G06N 3/08 |
| 2023/0230332 A1* | 7/2023 | Stoddart | G06T 7/70 |
| | | | 345/419 |
| 2024/0153216 A1* | 5/2024 | Lin | G06T 19/006 |
| 2024/0257473 A1* | 8/2024 | Zohar | G06F 3/017 |

FOREIGN PATENT DOCUMENTS

| | | |
|---|---|---|
| CN | 112257582 A | 1/2021 |
| CN | 112330784 A | 2/2021 |
| CN | 113034655 A | 6/2021 |
| WO | WO 2017/133009 A1 | 8/2017 |
| WO | WO 2020/259855 A1 | 12/2020 |

OTHER PUBLICATIONS

International Patent Application No. PCT/CN2022/079273; Int'l Search Report; dated May 13, 2022; 2 pages.

Yang; "Design of digital 3D panoramic super-resolution reconstruction system based on virtual reality"; Modern Electronics Technique; vol. 43 No. 10; May 2020; 4 pages (contains English Abstract).

Gong et al.; "The Module Builds of Virtual Shoe Fitting System"; Leather Science and Engineering; vol. 25 No. 2; Apr. 2015; p. 53-57 (contains English Abstract).

* cited by examiner

# SHOE TRY-ON METHOD AND APPARATUS BASED ON AUGMENTED REALITY, AND ELECTRONIC DEVICE

The present application is the national phase application of PCT International Patent Application No. PCT/CN2022/079273, filed on Mar. 4, 2022, which claims the priority to Chinese Patent Application No. 202110273630.6, titled "SHOE TRY-ON METHOD AND APPARATUS BASED ON AUGMENTED REALITY, AND ELECTRONIC DEVICE", filed on Mar. 11, 2021 with the Chinese Patent Office, both of which are incorporated herein by reference in their entireties.

FIELD

The present disclosure relates to the technical field of image processing, and in particular to a shoe try-on method based on augmented reality, a shoe try-on apparatus based on augmented reality, and an electronic device.

BACKGROUND

With the development of science and technology, the functions of terminal applications are gradually improved. For example, users may browse objects by using terminal applications. In addition, terminal devices may display some objects based on VR (Virtual Reality), providing users with a good browsing experience. However, for some objects such as shoes, there may be some deviation between viewing the objects and actually wearing the objects. For some shoes, the pictures of the shoes look good, but these shoes do not really look good when worn on feet. Therefore, in order to facilitate users choosing favorite shoes, the users may try on shoes based on AR (Augmented Reality). That is, the user may capture feet with a terminal device to obtain a foot picture, and then cover a shoe picture on the foot image, facilitating the user experiencing the appearance of the shoes realistically.

SUMMARY

The content part of the present disclosure is provided to introduce concepts in a brief form, and these concepts are to be described in detail in the following embodiments. The content of the present disclosure is not intended to identify the key features or essential features of the claimed technical solutions, nor is it intended to be used to limit the scope of the claimed technical solutions.

A shoe try-on method based on augmented reality, a shoe try-on apparatus based on augmented reality, and an electronic device are provided according to the embodiments of the present disclosure. With the present disclosure, an area of a real image is rendered based on a shoe mold, then the rendered image is displayed with maintaining an occlusion relationship between the shoe mold and a calf, thereby improving the experience of trying on a shoe based on AR.

In a first aspect, a shoe try-on method based on augmented reality is provided according to an embodiment of the present disclosure. The method includes: in response to a shoe try-on instruction, collecting a real image, and displaying the real image, where the real image includes at least one calf image, and the shoe try-on instruction indicates a shoe mold; determining an initial rendering area corresponding to a first calf image, where the at least one calf image includes the first calf image; determining an occlusion area based on the at least one calf image; determining a target rendering area in the initial rendering area based on the initial rendering area and the occlusion area; and rendering the target rendering area based on the shoe mold indicated by the shoe try-on instruction to obtain an enhanced shoe mold image, and displaying the enhanced shoe mold image on the real image.

In a second aspect, a shoe try-on apparatus based on augmented reality is provided according to an embodiment of the present disclosure. The apparatus includes: a collection unit, a first determination unit, a second determination unit, a third determination unit, and a displaying unit. The collection unit is configured to, in response to a shoe try-on instruction, collect a real image and display the real image, where the real image includes at least one calf image, and the shoe try-on instruction indicates a shoe mold. The first determination unit is configured to determine an initial rendering area corresponding to a first calf image, where the at least one calf image includes the first calf image. The second determination unit is configured to determine an occlusion area based on the at least one calf image. The third determination unit is configured to determine a target rendering area in the initial rendering area based on the initial rendering area and the occlusion area. The displaying unit is configured to render the target rendering area based on the shoe mold indicated by the shoe try-on instruction to obtain an enhanced shoe mold image, and display the enhanced shoe mold image on the real image.

In a third aspect, an electronic device is provided according to an embodiment of the present disclosure. The electronic device includes one or more processors and a memory. The memory stores one or more programs. The one or more programs, when executed by the one or more processors, causes the one or more processors to perform the shoe try-on method based on augmented reality provided in the first aspect.

In a fourth aspect, a computer-readable medium is provided according to an embodiment of the present disclosure. The computer-readable medium storage stores a computer program. The computer program, when executed by a processor, causes the processor to perform the shoe try-on method based on augmented reality provided in the first aspect.

With the shoe try-on method based on augmented reality, the shoe try-on apparatus based on augmented reality, and the electronic device according to the embodiments of the present disclosure, after detecting a shoe try-on instruction, a real image is collected in real time, and then an initial rendering area corresponding to a calf image in the real image may be determined. An occlusion area is determined based on all calf images in the real image, then a target rendering area is determined based on the occlusion area and the initial rendering area. The target rendering area is rendered based on the shoe mold. Therefore, with the present disclosure, only a part of the shoe mold, rather than the entire shoe mold, is displayed based on the occlusion relationship between the calf and the shoe mold, realistically closing to a process of the user actually trying on shoes, and providing the user with an immersive shoe try-on experience.

BRIEF DESCRIPTION OF THE DRAWINGS

The above and other features, advantages and aspects of the embodiments of the present disclosure will be more apparent in conjunction with the accompanying drawings and with reference to the following embodiments. Throughout the drawings, the same or similar reference numerals represent the same or similar elements. It should be understood that the drawings are schematic and the originals and elements are unnecessarily drawn to scale.

DETAILED DESCRIPTION OF THE EMBODIMENTS

The embodiments of the present disclosure are described in detail below with reference to the accompanying drawings. Although the drawings show some embodiments of the present disclosure, it should be understood that the present disclosure can be implemented in various forms and is not limited to the embodiments. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include additional steps and/or omit to perform the illustrated steps, not limiting the scope of the present disclosure.

The term "including" and its variants as used herein are open-ended includes, that is, "including but not limited to". The term "based on" means "based at least in part on." The term "one embodiment" means "at least one embodiment". The term "another embodiment" means "at least one additional embodiment". The term "some embodiments" means "at least some embodiments". Definitions of other terms are provided in the following description.

It should be noted that, the terms "first" "second" and so on mentioned in the present disclosure are only used to distinguishing different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

The names of messages or information exchanged between multiple devices in the embodiments of the present disclosure are only illustrative, and are not intended to limit the scope of the messages or information.

Figure 1:
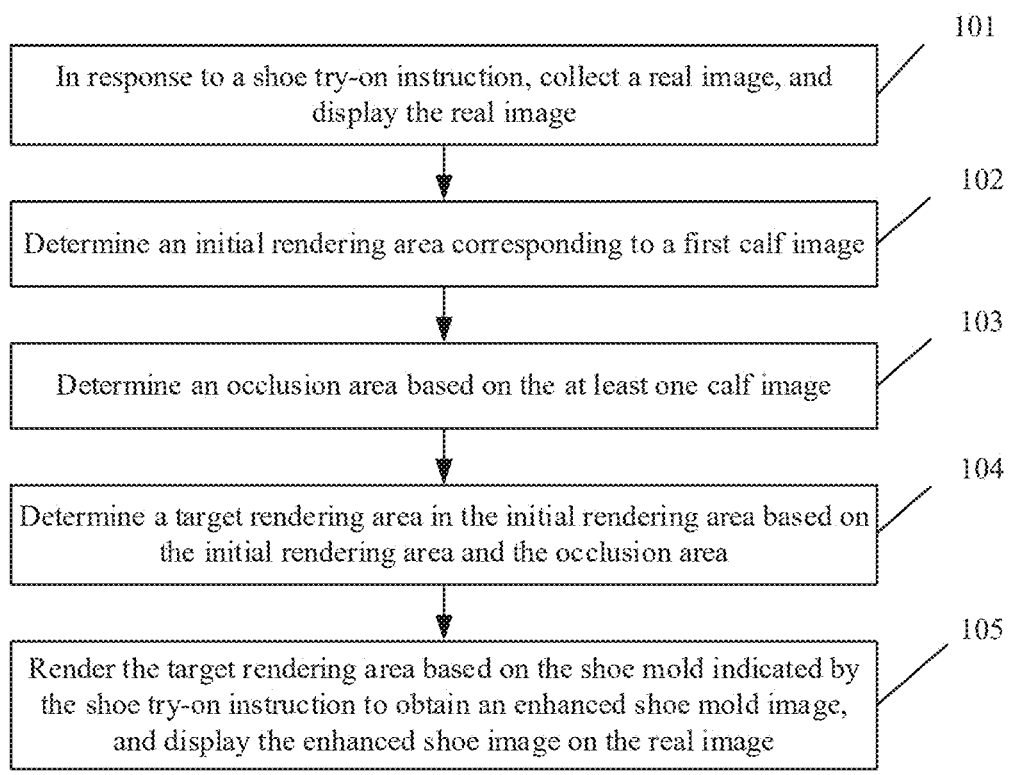
FIG. 1 is a flow chart of a shoe try-on method based on augmented reality according to an embodiment of the present disclosure.

Reference is made to FIG. 1, which shows a flow chart of a shoe try-on method based on augmented reality according to an embodiment of the present disclosure. The shoe try-on method based on augmented reality may be applied to a terminal device. As shown in FIG. 1, the shoe try-on method based on augmented reality includes the following steps 101 to 105.

In step 101, in response to a shoe try-on instruction, a real image is collected in real time, and the real image is displayed.

The real image includes at least one calf image.

The shoe try-on instruction indicates a shoe mold.

In some embodiments, the real image may be understood as an image that is captured in real time by an imaging device (such as a camera) under the control of an execution body. That is, on detecting a shoe try-on instruction, the execution body controls an camera to operate to collect an image, and then displays the collected image. The displayed image may be understood as a real image.

In some embodiments, since the user wants to try on shoes based on AR, the image collected by the user in real time may include at least one calf image. That is, a calf image in the collected real image may indicate a calf, and one calf image may indicate one calf.

As an example, in a case that the user wants to try on one shoe based on AR, the collected real image may only include one calf image; and in a case that the user wants to try on both shoes based on AR, the collected real image may include two calf images.

In some embodiments, after the user performs predefined operations on the execution body, the execution body may generate a shoe try-on instruction. As an example, when the user browses a shoe mold and clicks on a control on a display interface, a shoe try-on instruction is generated. Correspondingly, the shoe mold currently being browsed may be understood as a shoe mold indicated by the shoe try-on instruction. Apparently, it should be noted that the shoe try-on instruction may be generated in many ways, which are not described in detail herein for the simplicity of the specification.

In step 102, an initial rendering area corresponding to a first calf image is determined.

The at least one calf image includes the first calf image.

In some embodiments, the real image may include multiple calf images, and the first calf image may be one of the calf images. That is, in a case that it is required to add a shoe mold to a calf corresponding to a calf image, the calf image may be determined as the first calf image.

In some embodiments, the initial rendering area may be understood as an area required for rendering the shoe mold after the shoe mold is placed in a posture. As an example, after the initial rendering area is rendered based on a style of the shoe mold, the shoe try-on process based on AR is performed.

In some embodiments, the calf image indicates a calf After the user puts on a shoe, the shoe usually wrap around an entire sole of a foot, and a shoe opening of the shoe usually wraps around a heel of the calf. Most part of the calf is usually exposed. That is, it should be understood that the shoe and the calf usually have a position relationship.

Therefore, there is a position relationship between the initial rendering area and the calf image (for example, in the displayed image, the initial rendering area intersects at least partially with a display area of the calf image). Thus, the initial rendering area may be determined based on the first calf image.

In step 103, an occlusion area is determined based on the at least one calf image.

In some embodiments, in the user trying on a shoe, the calf image may be completely displayed to achieve a good shoe try-on experience. For example, in a case of performing photographing from top to bottom, the calf of the user is not obstructed by the shoe mold, so that an area displaying the calf image may be understood as an occlusion area. That is, the occlusion area is an area displaying an original image.

Figure 2A:
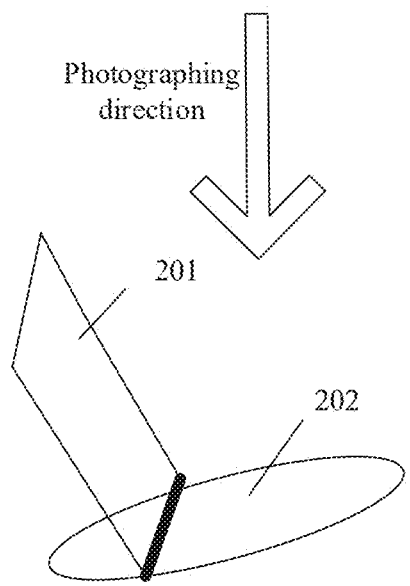
FIG. 2A is a schematic diagram of performing photographing in a shoe try-on method based on augmented reality according to an embodiment of the present disclosure.
Figure 2B:
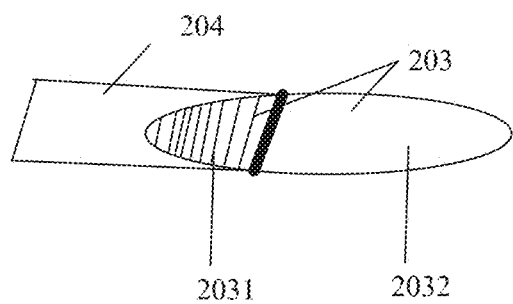
FIG. 2B is a schematic diagram of performing displaying in a shoe try-on method based on augmented reality according to an embodiment of the present disclosure.

As an example, descriptions are provided in conjunction with FIGS. 2A and 2B. FIG. 2A is a schematic diagram of performing photographing, and FIG. 2B is a schematic diagram of a real image. FIG. 2A shows a position relationship between a calf 201 and a shoe mold 202. In a case of performing photographing in a photographing direction shown in FIG. 2A, a real image may be obtained as shown in FIG. 2B. The initial rendering area may be understood as an area 203, and a projection area of a calf image may be understood as an occlusion area 204. It can be seen that an area 2031 in the initial rendering area 203 is obscured by the occlusion area 204. That is, in performing rendering based on the shoe mold, the area 2031 may not be rendered, and the occlusion region 204 may display the original image.

In some embodiments, the calf image indicates a calf. A calf may obscure the shoe mold. Therefore, an occlusion area in a target shoe mold area to be rendered may be determined based on the at least one calf image.

In step 104, a target rendering area in the initial rendering area is determined based on the initial rendering area and the occlusion area.

In some embodiments, an area in the initial rendering area may be obscured, that is, the area that is obscured in the initial rendering area displays the original image, and the area that is not obscured in the initial rendering area is rendered based on the shoe mold. A part of the initial rendering area that is not included in the occlusion area may be understood as a target rendering area.

Referring to FIG. 2B, an area 2031 in an initial rendering area 203 is obscured by an occlusion area 204, and an area 2032 in the initial rendering area 203 is not obscured. Thus, the area 2032 may be understood as a target rendering area.

In step 105, the target rendering area is rendered based on the shoe mold indicated by the shoe try-on instruction to obtain an enhanced shoe mold image, and the enhanced shoe mold image is displayed on the real image.

In some embodiments, to achieve a shoe try-on effect, an area in the real image may be rendered based on the shoe mold to obtain an enhanced shoe mold image. In performing rendering, in order to provide the user with a good immersive experience (that is, to make the shoe try-on process based on AR realistic), the target rendering area may be determined based on the initial rendering area and the occlusion area, and then only the target rendering area may be rendered. That is, the occlusion area may display the original image (that is, the occlusion area may directly display a scene in the real image), and the target rendering area may be rendered based on the shape of the shoe mold. In this way, it may realistically close to a process of the user actually trying on shoes, thereby improving the shoe try-on experience based AR.

It can be seen that after detecting a shoe try-on instruction, a real image is collected in real time, and then an initial rendering area corresponding to a calf image in the real image may be determined. An occlusion area is determined based on all calf images in the real image, then a target rendering area is determined based on the occlusion area and the initial rendering area. The target rendering area is rendered based on the shoe mold. Therefore, with the present disclosure, only a part of the shoe mold, rather than the entire shoe mold, is displayed based on the occlusion relationship between the calf and the shoe mold, realistically closing to a process of the user actually trying on shoes, and providing the user with an immersive shoe try-on experience.

In some embodiments, a shoe mold corresponds to a shoe. That is, a shape (including shape and color) of a shoe mold may be pre-configured based on an actual shoe. Therefore, after detecting a shoe try-on instruction, the target rendering area may be rendered based on the shape and color of the shoe mold.

In some embodiments, the real image usually further includes a foot image of the user. Thus, the initial rendering area may be determined by identifying multiple feature points of the foot image of the user. As an example, a toe area, a heel area and the like may be identified in foot image, and the initial display area overlaps with most of the display area of the foot image. Therefore, based on an identification result, an approximate area of an initial rendering area may be determined, and a placement posture of the shoe mold may be determined by identifying the toe area, the heel area and the like in the foot image. Then, based on the placement posture of the shoe mold, the determined approximate area (that is, the approximate area of the initial rendering area) may be corrected to obtain the target rendering area.

In some embodiments, the step 102 (in which the initial rendering area corresponding to the target calf image is determined) may include: based on a position of the first calf image in the real image, determining a posture of a first calf indicated by the first calf image in a three-dimension space; based on the posture of the first calf in the three-dimension space, determining a posture of the shoe mold indicated by the shoe try-on instruction in the three-dimension space; and based on the posture of the shoe mold indicated by the shoe try-on instruction in the three-dimension space and a shape of the shoe mold indicated by the shoe try-on instruction, determining the initial rendering area.

In some embodiments, a three-dimension coordinate system may be constructed with a lens as a coordinate origin and with an axis of the lens as a Z-axis, thus a posture of a first calf in a three-dimension space may be determined based on coordinates of the first calf in the three-dimension coordinate system. The three-dimension space may be constructed with an axis of a lens as a Z-axis or with a normal of the earth as a Z-axis.

Apparently, in specific implementations, the three-dimension coordinate system may be constructed in other ways according to actual situations, which is repeated herein.

In some embodiments, in a case that the three-dimension space is constructed with an axis of a lens as a Z-axis, the posture of the first calf indicated by the first calf image in the three-dimensional space may be determined with an image identification technology. The posture may be understood as a position and a posture (an orientation of the calf).

As an example, coordinates of an area of the first calf (such as a heel area of the calf and a middle area of the calf) in the three-dimension coordinate system may be determined. The orientation of the calf may be identified by using an Euler angle or a unit direction vector. Coordinates may indicate the position of the calf, thus the posture of the target calf in three-dimension space is determined.

In some embodiments, since a position relationship exists between the shoe mold and the calf, a placement posture of the shoe mold may be determined based on the posture of the target calf indicated by the target calf image. For example, an opening of the shoe mold is oriented in a same direction as the calf, and an upper of the shoe mold is usually at an angle, such as 90 degrees, to the calf. Therefore, the placement posture of the shoe mold may be determined based on the posture of the calf.

Figure 3:
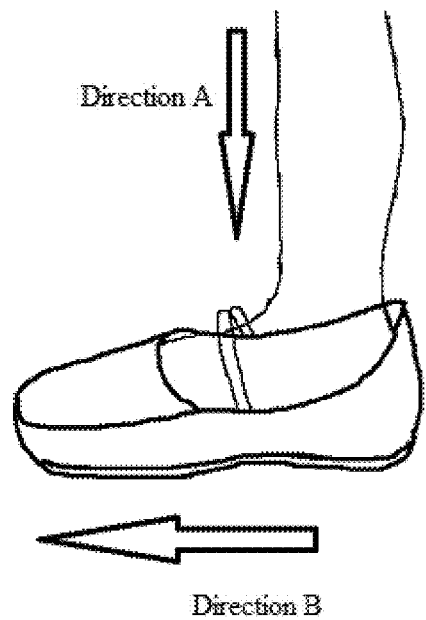
FIG. 3 is a schematic diagram showing orientations of a shoe mold and a calf in a shoe try-on method based on augmented reality according to an embodiment of the present disclosure.

For example, as shown in FIG. 3, in a case that the posture of the first calf indicates that the target calf is facing a direction A, since a toe of the shoe mold is usually perpendicular to a direction of a calf, a direction indicated by the toe of the shoe mold may be a direction B. The foot of the calf usually contacts to the shoe opening of the shoe mold. Therefore, the placement posture of the shoe mold may be determined based on the posture of the target calf indicated by the first calf image.

In some embodiments, different shoe molds may have different shapes. Therefore, different shoe molds placed in a same posture in the three-dimension space may have different projection areas. That is, in order to obtain an accurate shoe mold area to be rendered, the initial rendering area may be determined based on the posture of the target calf in the target three-dimension coordinate system and the shape of the shoe mold indicated by the shoe try-on instruction.

In some embodiments, the initial rendering area may be understood as: a projection area of a shoe mold projected on a real image after the shoe mold is placed in a three-dimension space in response to a shoe mold posture instruction.

In some embodiments, the step 103 (in which the occlusion area in the shoe mold area to be rendered is determined based on the at least one calf image) may include: adding a calf model corresponding to the at least one calf image in a three-dimension space; and determining the occlusion area based on an occlusion relationship between the shoe mold indicated by the shoe try-on instruction and the added calf model.

In some embodiments, in a case that the pants worn by the user are loose or the user wears an item on a leg, the occlusion area may be large, affecting the user's shoe try-on experience. Therefore, some calf models may be pre constructed. A calf model corresponds to a calf image, and a calf image indicates a calf. Thus, the calf model may be added in the three-dimension space at a position corresponding to the calf, and the posture of the calf model may be kept consistent with the posture of the calf.

Figure 4:
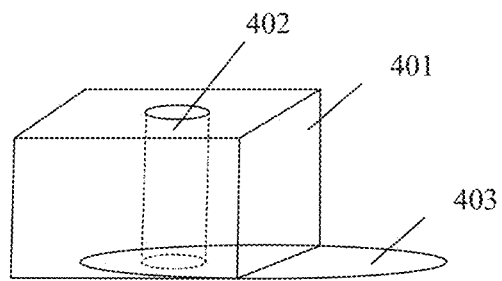
FIG. 4 is a schematic diagram of performing displaying in a shoe try-on method based on augmented reality according to another embodiment of the present disclosure.

For ease of understanding, explanations are provided in conjunction with FIG. 4. It can be seen that a volume of a calf 401 (including pants) is larger than a volume of a calf model 402. Therefore, in performing photographing in a direction, a large area of the shoe mold 403 may be obscured, thereby affecting the user's shoe try-on experience.

In some embodiments, in projecting a shoe mold, a calf may not obscure the shoe mold. Thus, the calf may not obstruct the displaying of the shoe mold. Correspondingly, the calf image area that does not obstruct the displaying of the shoe mold is not an occlusion area. That is, in order to make the displayed shoe mold image in line with the actual situation, the occlusion area may be determined based on the occlusion relationship between the calf and the shoe mold.

In some embodiments, based on a posture of a calf indicated by the at least one calf image in the three-dimension space, a posture of the calf model in the three-dimension space may be determined; and based on the determined posture of the calf model in the three-dimension space, the calf model is added in the three-dimension space.

In some embodiments, since the posture of the calf indicated by the calf image in the three-dimension space has been determined, the calf model may be directly added in the three-dimension space based on the posture of the calf indicated by the calf image in the three-dimension space.

In some embodiments, a first calf model corresponding to the first calf image may be added in the three-dimension space by: based on a posture of the shoe mold in the three-dimension space, determining a posture of the first calf model corresponding to the first calf image in the three-dimension space; and based on the posture of the first calf model in the three-dimension space, adding the first calf model in the three-dimension space.

In some embodiments, since a shoe mold corresponds to a first calf, the posture of the first calf model may be determined based on the posture of the shoe mold to integrate the first calf with the shoe mold. As an example, the first calf model may be aligned with the opening of the shoe mold, thereby obtaining an accurate occlusion area.

For understanding, examples are provided below. In a case that a user wears loose pants, the calf image of the user may include the image of the user's loose pants, thus there may be some errors in determining the posture of the user's calf. If the posture of the first calf model is determined based on the posture of the first calf, the first calf model may mismatch the shoe mold. For example, the first calf model obscures the opening of the shoe mold, or the first calf model is not well aligned with the shoe mold. Thus, the final determined occlusion area is not accurate, affecting the user's shoe try-on effect.

In some embodiments, the at least one calf image may further include a second calf image, and a posture of a calf three-dimension model corresponding to the second calf image may be determined based on the posture of the calf indicated by the second calf image in the three-dimension space. The second calf model may be added to the three-dimension space.

The second calf image may be understood as a calf image in the real image except for the first calf image.

In some embodiments, since the shoe mold corresponds to the first calf image, the posture of the first calf model may affect the user's shoe try-on experience. The occlusion of the shoe mold by the second calf model may be adjusted by the user to change a position relationship between the first calf and the second calf. As an example, it is assumed that the first calf is the left calf and the second calf is the right calf. When the user performs photographing from top to bottom, the right calf is on the left calf, thus the right calf (the second calf) may obscure the shoe mold. Therefore, the user may move the left calf to the right calf, so the right calf cannot obscure the shoe mold. That is, the occlusion of the second calf model on the shoe mold may be easily changed by the user adjusting the position relationship between the calves. Therefore, in order to simplify the processing, the posture of the second calf model may be determined based on the posture of the second calf.

In some embodiments, the posture of the calf indicated by the at least one calf image in the three-dimension space may be determined by: inputting the real image to a pre-established annotation model to determine the posture of the calf indicated by the at least one calf image in three-dimensional space.

The annotation model is established by: obtaining a training sample set, and training a pre-established initial neural network based on the training sample set to obtain the calculation model.

The training samples in the training sample set include real images for training and calf postures corresponding to the real images for training.

The real images for training include calf images.

In some embodiments, after determining the training samples, a calculation model for determining a posture of a calf may be obtained by training a conventional deep learning framework (such as a PyTorch framework or a Tensorflow framework). In performing training, an appropriate initial neural network model model (such as a mobilenet model or a shufflenet model) may be selected according to actual requirements. Accordingly, an optimization algorithm used in performing training may be a SGD (gradient descent algorithm), an Adam algorithm and the like, and the loss function may be an L1 loss function or an L2 loss function.

In some embodiments, the posture of the calf indicated by the at least one calf image in the three-dimension space may be obtained by using the obtained calculation model.

In some embodiments, the step 103 (in which the occlusion area is determined based on the at least one calf image) may include: identifying the at least one calf image to determine an original image display area corresponding to the at least one calf image; and determining the original image display area as the occlusion area.

In some embodiments, since the user usually performs photographing from top to bottom, the calf image is in the occlusion area. Thus, a boundary area of the calf image may be identified, and the boundary area of the calf image may be determined as an original image display area (occlusion area). It should be noted that the boundary area of the calf image is an area from an ankle to a knee.

In some embodiments, the step 103 (in which the occlusion area is determined based on the at least one calf image) may include: based on an projection area of a pre-established calf model, obtaining an initial original image display area corresponding to the at least one calf image; adjusting the initial original image display area based on a direction vector of the at least one calf image to obtain an original image display area corresponding to the at least one calf image; and determining the original image display area as the occlusion area.

In some embodiments, the user may wear pantyhose, so that the calf image may include images of the pantyhose worn by the user, resulting in a wide area of the calf image. Therefore, an initial original image display area corresponding to the at least one calf image may be determined.

In some embodiments, a calf model may be preset, and a direction may be preset for the calf model. A calf image may correspond to a calf model, thus an initial original image display area corresponding to the at least one calf image may be determined.

In some embodiments, after determining the initial original image display area, a direction vectors of the at least one calf image may be determined. Then, the initial original image display area may be adjusted based on the determined direction vectors of the at least one calf image to obtain an original image display area.

As an example, after pre-defining the preset direction of the calf model, the initial display areas have a same shape and do not correspond to the calf image. Therefore, it is required to adjust the initial original image display area based on the position of the calf image in the real image.

In some embodiments, the direction vector of the at least one calf image may be determined, and the initial display area may be adjusted based on the direction vector.

In some embodiments, the initial original image display area is determined based on the projection of the calf model, and the initial original image display area is adjusted based on the direction vector of the calf image, thereby obtaining an accurate original image display area, thus achieving a good shoe try-on effect based on AR.

In some embodiments, an initial original image display area corresponding to the first calf image may be adjusted by: identifying a shoe opening rendering area in the initial rendering area; and adjusting the initial original image display area corresponding to the first calf image based on the shoe opening rendering area and a direction vector of the first calf image.

In some embodiments, in order to avoid excessive occlusion of the opening area of the shoe mold by the first calf image (for example, the shoe mold usually wraps around the user's ankle, that is, a calf image may only obscure a small part of the opening area of the shoe mold; if the first calf image obscured the entire opening area of the shoe mold, it does not match the actual situation, causing excessive occlusion of the shoe mold and affecting the user's AR shoe try-on experience), the initial original image display area corresponding to the first calf image may be determined based on the direction vector between the rendered area of the shoe opening and the image of the first calf, thereby obtaining an accurate original image display area and avoiding excessive occlusion of the shoe mold.

In some embodiments, the real image may be inputted to a pre-established direction determination model to obtain the direction vector corresponding to the at least one calf image.

The area identification model may be established by: obtaining a training sample set, and training a pre-established initial neural network based on the training sample set to obtain the area identification model.

The training samples in the training sample set include calf images for training and direction vectors corresponding to the calf images for training.

In some embodiments, after inputting an initial image to the direction determination model, the direction determination model may automatically identify and determine a direction vector of the at least one calf image based on the inputted real image.

From the above description, it can be seen that in determining the occlusion area, the occlusion area may be determined based on the occlusion relationship between the shoe mold and the calf model and the manner in which the calf model is projected; or the occlusion area may be determined by obtaining an initial original image display area corresponding to the at least one calf image and then adjusting the initial original image display area to obtain an original image display area. In determining the occlusion area based on the occlusion relationship between the shoe mold and the calf model, it is only required to identify the posture of the calf and place the calf model according to the determined posture, thereby quickly determining the occlusion area. In determining the initial original image display area corresponding to the at least one calf image and then adjusting the initial original image display area, it is required to identify the shoe opening area and the calf image may be segmented and identified, thereby obtaining an accurate occlusion area.

Figure 5:
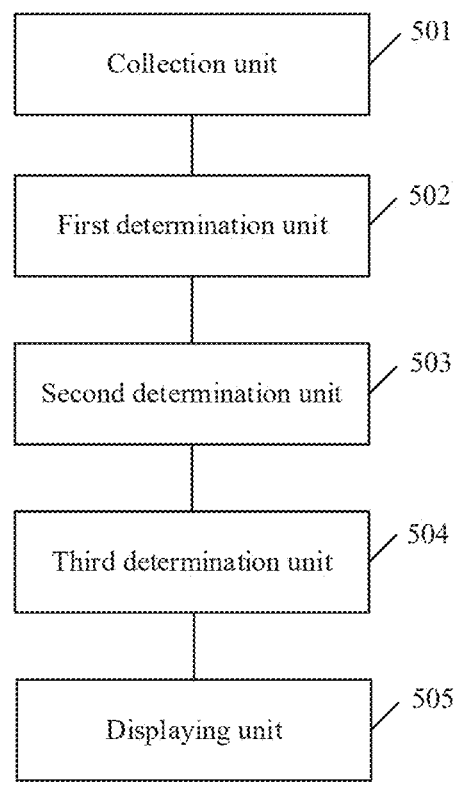
FIG. 5 is a schematic structural diagram of a shoe try-on apparatus based on augmented reality according to an embodiment of the present disclosure.

Further referring to FIG. 5, as an implementation of the method shown in the above Figures, a shoe try-on apparatus based on augmented reality is provided according to an embodiment of the present disclosure. The apparatus embodiments correspond to the embodiments of the shoe try-on method based on augmented reality shown in FIG. 1. The apparatus may be applied to various electronic devices.

As shown in FIG. 5, the shoe try-on apparatus based on augmented reality in the embodiment includes: a collection unit 501, a first determination unit 502, a second determination unit 503, a third determination unit 504, and a displaying unit 505. The collection unit 501 is configured to, in response to a shoe try-on instruction, collect a real image and display the real image, where the real image includes at least one calf image, and the shoe try-on instruction indicates a shoe mold. The first determination unit 502 is configured to determine an initial rendering area corresponding to a first calf image, where the at least one calf image includes the first calf image. The second determination unit 503 is configured to determine an occlusion area based on the at least one calf image. The third determination unit 504 is configured to determine a target rendering area in the initial rendering area based on the initial rendering area and the occlusion area. The displaying unit 505 is configured to render the target rendering area based on the shoe mold indicated by the shoe try-on instruction to obtain an enhanced shoe mold image, and display the enhanced shoe mold image on the real image.

In some embodiments, the first determination unit 502 is further configured to: based on a position of the first calf image in the real image, determine a posture of a first calf indicated by the first calf image in a three-dimension space; based on the posture of the first calf in the three-dimension space, determine a posture of the shoe mold indicated by the shoe try-on instruction in the three-dimension space; and based on the posture of the shoe mold indicated by the shoe try-on instruction in the three-dimension space and a shape of the shoe mold indicated by the shoe try-on instruction, determine the initial rendering area.

In some embodiments, the second determination unit 503 is further configured to: add a calf model corresponding to the at least one calf image in a three-dimension space; and determine the occlusion area based on an occlusion relationship between the shoe mold indicated by the shoe try-on instruction and the added calf model.

In some embodiments, the second determination unit 503 is further configured to: based on a posture of a calf indicated by the at least one calf image in the three-dimension space, determine a posture of the calf model in the three-dimension space; and based on the determined posture of the calf model in the three-dimension space, add the calf model in the three-dimension space.

In some embodiments, the second determination unit 503 is further configured to: based on a posture of the shoe mold in the three-dimension space, determine a posture of the first calf model corresponding to the first calf image in the three-dimension space; and based on the posture of the first calf model in the three-dimension space, add the first calf model in the three-dimension space.

In some embodiments, the second determination unit 503 is further configured to determine the posture of the calf indicated by the at least one calf image in the three-dimension space by: inputting the real image to a pre-established annotation model to determine the posture of the calf indicated by the at least one calf image in three-dimensional space. The annotation model is established by: obtaining a training sample set, where training samples in the training sample set include real images for training and calf postures corresponding to the real images for training, and the real images for training include calf images; and training a pre-established initial neural network based on the training sample set to obtain the annotation model.

In some embodiments, the second determination unit 503 is further configured to: identify the at least one calf image to determine an original image display area corresponding to the at least one calf image; and determine the original image display area as the occlusion area.

In some embodiments, the second determination unit 503 is further configured to: based on an projection area of a pre-established calf model, obtain an initial original image display area corresponding to the at least one calf image; adjust the initial original image display area based on a direction vector of the at least one calf image to obtain an original image display area corresponding to the at least one calf image; and determine the original image display area as the occlusion area.

In some embodiments, the second determination unit 503 is further configured to adjust an initial original image display area corresponding to the first calf image by: identifying a shoe opening rendering area in the initial rendering area; and adjusting the initial original image display area corresponding to the first calf image based on the shoe opening rendering area and a direction vector of the first calf image.

In some embodiments, the second determination unit 503 is further configured to determine the direction vector of the at least one calf image by: inputting the real image to a pre-established direction determination model to obtain the direction vector corresponding to the at least one calf image. The direction determination model is established by: obtaining a training sample set, where training samples in the training sample set include calf images for training and direction vectors corresponding to the reality images for training; and training a pre-established initial neural network based on the training sample set to obtain the direction determination model.

Figure 6:
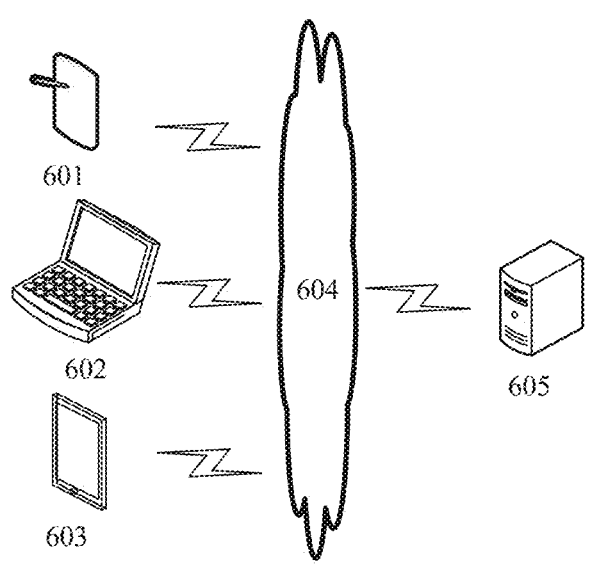
FIG. 6 shows an exemplary system architecture to which a shoe try-on method based on augmented reality according to an embodiment of the present disclosure may be applied.

Reference is further made to FIG. 6, which shows an exemplary system architecture to which a shoe try-on method based on augmented reality according to an embodiment of the present disclosure may be applied.

As shown in FIG. 6, the system architecture may include terminal devices 601, 602 and 603, a network 604, and a server 606. The network 604 may provide a medium for communication links between the terminal devices 601, 602, and 603, and the server 606. The network 604 may include various types of connections, such as wired connection, wireless communication links, or fiber optic cables.

The terminal devices 601, 602, and 603 may interact with the server 605 through the network 604 to receive or send messages. Various client applications, such as web browser applications, search applications, and news and information applications, may be installed on the terminal devices 601, 602, and 603. The client applications installed in the terminal devices 601, 602 and 603 may receive an instruction from the user and perform corresponding functions in response to the instruction from the user, such as adding information to information in response to an instruction from the user.

The terminal devices 601, 602, and 603 may be in a form of hardware or software. In a case that the terminal devices 601, 602, and 603 are in a form of hardware, the terminal devices 601, 602, and 603 may be various electronic devices that have a display screen and support web browsing, including but not limited to smart phones, tablet computers, e-book readers, MP3 (Moving Picture Experts Group Audio Layer III) players, MP4 (Moving Picture Experts Group Audio Layer IV) players, laptops and desktops. In a case that the terminal devices 601, 602, and 603 are in a form of software, the terminal devices 601, 602, and 603 may be installed in the electronic devices listed above. The terminal devices 601, 602, and 603 may be implemented as multiple software or software modules (such as software or software modules for providing distributed services), or may be implemented as a single software or software module, which is not limited herein.

The server 605 may provide various services. For example, the server 605 may receive information acquisition requests from the terminal devices 601, 602, and 603, obtain display information corresponding to the information acquisition request in various ways based on the information acquisition request, and transmit data of the display information to the terminal devices 601, 602, and 603.

It should be noted that the information processing method according to the embodiments of the present disclosure may be performed by a terminal device, and the shoe try-on apparatus based on augmented reality may be arranged in the terminal devices 601, 602, and 603. In addition, the information processing method according to the embodiments of the present disclosure may be performed by the server 605, and the information processing apparatus may be arranged in the server 605.

It should be understood that the numbers of terminal devices, networks and servers in FIG. 6 are only illustrative, and any number of numbers of terminal devices, networks and servers may be configured according to implementation requirements.

Hereinafter, reference is made to FIG. 7, which shows a schematic structural diagram of an electronic device (such as the terminal device or the server shown in FIG. 6) suitable for implementing the embodiments of the present disclosure. The terminal devices according to the embodiments of the present disclosure may include, but are not limited to, mobile terminals, such as mobile phones, laptops, digital broadcast receivers, PDAs (personal digital assistants), PADs (tablet PCs), PMPs (portable multimedia players) and vehicle-mounted terminals (such as in-vehicle navigation terminals), and fixed terminals such as digital TVs and desktop computers. The electronic device shown in FIG. 7 is only exemplary, and should not indicate any limitation to the function and application scope of the embodiments of the present disclosure.

Figure 7:
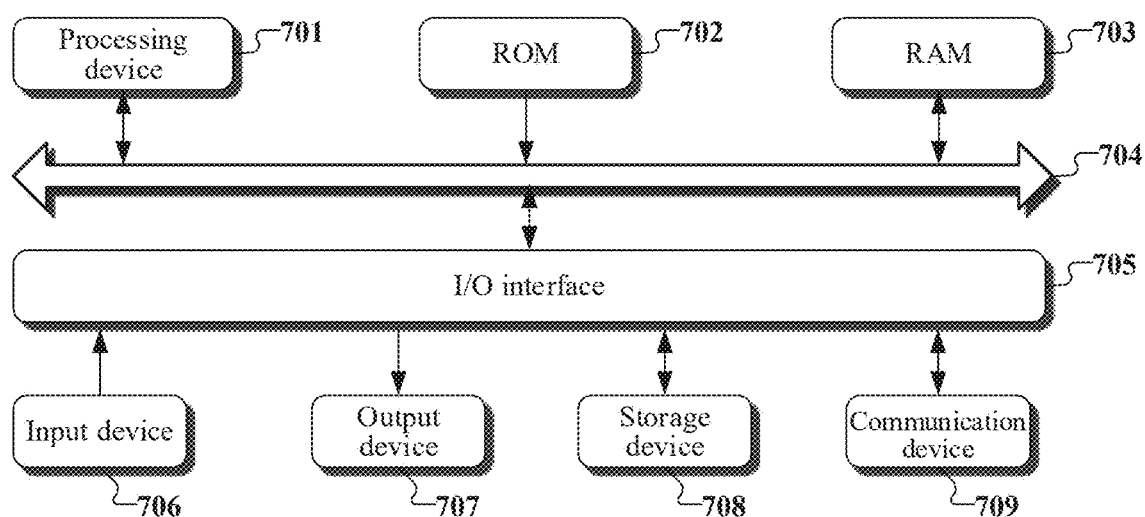
FIG. 7 is a schematic structural diagram of an electronic device according to an embodiment of the present disclosure.

As shown in FIG. 7, the electronic device may include a processing device 701 (such as a central processor and a graphics processor) which may execute various operations and processing through a program stored in a Read Only Memory (ROM) 702 or a program loaded from the storage device 708 into a Random Access Memory (RAM) 703. The RAM 703 is further configured to store various programs and data required by the electronic device 700. The processing device 701, the ROM 702 and the RAM 703 are connected to each other through a bus 704. An Input/output (I/O) interface 705 is also connected to the bus 704.

Generally, the I/O interface 705 may be connected to: an input device 706, such as a touch screen, a touch panel, a keyboard, a mouse, a camera, a microphone, an accelerometer, and a gyroscope; an output device 707, such as a liquid crystal display (LCD), a speaker, and a vibrator; a storage device 708 such as a magnetic tape and a hard disk; and a communication device 709. The communication device 709 enables the electronic device to perform wireless or wired communication with other devices for data exchanging.

Although FIG. 7 shows an electronic device having various components, it should be understood that the illustrated components are not necessarily required to all be implemented or included. Alternatively, more or fewer components may be implemented or included.

Particularly, according to some embodiments of the present disclosure, the process described above in conjunction with flow charts may be implemented as a computer software program. For example, a computer program product is further provided according to an embodiment of the present disclosure, including a computer program carried on a computer readable medium. The computer program includes program codes for performing the method shown in the flow charts. In the embodiment, the computer program may be downloaded and installed from the network via the communication device 709, or installed from the storage device 708, or installed from the ROM 702. When the computer program is executed by the processing device 701, the above-mentioned functions defined in the method according to the embodiments of the present disclosure are performed.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In some embodiments of the present disclosure, the computer readable storage medium may be any tangible medium containing or storing a program, and the program may be used by or in combination with an instruction execution system, apparatus, or device. In some embodiments of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

In some embodiments, the client and the server may perform communication using any currently known or future developed network protocol such as HTTP (HyperText Transfer Protocol), and may be interconnected with any form or medium of digital data communication (for example, a communication network). The communication network embodiments include local area networks ("LANs"), wide area networks ("WANs"), internet, end-to-end networks (for example, ad hoc end-to-end networks), and any networks currently known or developed in the future.

The computer readable medium may be incorporated in the electronic device, or may exist alone without being assembled into the electronic device.

The computer readable medium carries one or more programs. The one or more programs, when being executed by the electronic device, cause the electronic device to: in response to a shoe try-on instruction, collect a real image, and display the real image, where the real image includes at least one calf image, and the shoe try-on instruction indicates a shoe mold; determine an initial rendering area corresponding to a first calf image, where the at least one calf image includes the first calf image; determining an occlusion area based on the at least one calf image; determining a target rendering area in the initial rendering area based on the initial rendering area and the occlusion area; and rendering the target rendering area based on the shoe mold indicated by the shoe try-on instruction to obtain an enhanced shoe mold image, and display the enhanced shoe image on the real image.

Computer program code for performing operations of the present disclosure may be written in one or more programming languages, or a combination of the foregoing, and the programming language includes, but is not limited to, object oriented programming languages, such as Java, Smalltalk, and C++, also includes conventional procedural programming languages, such as "C" language or similar programming languages. The program codes may be executed entirely on a user's computer, or be executed partly on the user's computer, or be executed as a stand-alone software package, or be executed partly on the user's computer and partly on a remote computer, or be executed entirely on the remote computer or server. In a case that the execution of the program code involves a remote computer, the remote computer may be connected to a user's computer via any kind of network, including a local area network (LAN) or a wide area network (WAN), or may be connected to an external computer (for example, via an Internet providing by an Internet service provider).

The flow charts and block diagrams in the Figures shows the architecture, functionality and operation of possible implementations of the products of system, method and computer program provided according to the embodiments of the present disclosure. Each block in the flow charts or block diagrams can represent a module, a program segment, or a part of codes, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the block diagrams and/or flow charts, and combinations of blocks in the block diagrams and/or flowcharts, can be implemented by a dedicated hardware-based system which is configured to implement specified functions or operations, or can be implemented by using a combination of dedicated hardware and computer instructions.

The units mentioned in the description of the embodiments of the present disclosure may be implemented by means of software, or otherwise by means of hardware. The designation of these units does not in any case constitute a qualification of the unit itself. For example, the collection unit 501 may also be described as "a unit for collecting a real image".

The functions described above in this application may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD), and so on.

In the present disclosure, a machine-readable medium may be a tangible medium, which may contain or store a program used by the instruction execution system, apparatus, or device or a program used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of thereof. The machine-readable storage media, for example, includes an electrical connection based on one or more wires, a portable computer disk, a hard drive, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of thereof.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

In addition, although the operations are described in a specific order, it should not be understood that these operations are to be performed in the specific order shown or performed in a sequential order. Under certain circumstances, multitasking and parallel processing may be advantageous. Although the specific implementation details are described above, these implementation details should not be construed as limiting the scope of the present disclosure. The features described in multiple separate embodiments may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims.

The invention claimed is:

1. A shoe try-on method based on augmented reality, comprising:
   in response to a shoe try-on instruction, collecting a real image, and displaying the real image, wherein the real image comprises at least one calf image, and the shoe try-on instruction indicates a shoe mold;

determining an initial rendering area corresponding to a first calf image, wherein the at least one calf image comprises the first calf image;

determining an occlusion area based on the at least one calf image, wherein the determining the occlusion area based on the at least one calf image comprises;

adding a calf model corresponding to the at least one calf image in a three-dimension space, and determining the occlusion area based on an occlusion relationship between the shoe mold indicated by the shoe try-on instruction and the added calf model;

determining a target rendering area in the initial rendering area based on the initial rendering area and the occlusion area; and rendering the target rendering area based on the shoe mold indicated by the shoe try-on instruction to obtain an enhanced shoe mold image, and displaying the enhanced shoe image on the real image.

2. The method according to claim 1, wherein the determining an initial rendering area corresponding to the first calf image comprises:

based on a position of the first calf image in the real image, determining a posture of a first calf indicated by the first calf image in a three-dimension space;

based on the posture of the first calf in the three-dimension space, determining a posture of the shoe mold indicated by the shoe try-on instruction in the three-dimension space; and based on the posture of the shoe mold indicated by the shoe try-on instruction in the three-dimension space and a shape of the shoe mold indicated by the shoe try-on instruction, determining the initial rendering area.

3. The method according to claim 1, wherein the adding a calf model corresponding to the at least one calf image in a three-dimension space comprises:

based on a posture of a calf indicated by the at least one calf image in the three-dimension space, determining a posture of the calf model in the three-dimension space; and based on the determined posture of the calf model in the three-dimension space, adding the calf model in the three-dimension space.

4. The method according to claim 3, wherein the posture of the calf indicated by the at least one calf image in the three-dimension space is determined by:

inputting the real image to a pre-established annotation model to determine the posture of the calf indicated by the at least one calf image in three-dimensional space; and the annotation model is established by:

obtaining a training sample set, wherein training samples in the training sample set comprise real images for training and calf postures corresponding to the real images for training, and the real images for training comprises calf images; and training a pre-established initial neural network based on the training sample set to obtain the annotation model.

5. The method according to claim 1, wherein a first calf model corresponding to the first calf image is added in the three-dimension space by:

based on a posture of the shoe mold in the three-dimension space, determining a posture of the first calf model corresponding to the first calf image in the three-dimension space; and based on the posture of the first calf model in the three-dimension space, adding the first calf model in the three-dimension space.

6. The method according to claim 1, wherein the determining an occlusion area based on the at least one calf image comprises:

identifying the at least one calf image to determine an original image display area corresponding to the at least one calf image; and determining the original image display area as the occlusion area.

7. The method according to claim 1, wherein the determining an occlusion area based on the at least one calf image comprises:

based on an projection area of a pre-established calf model, obtaining an initial original image display area corresponding to the at least one calf image;

adjusting the initial original image display area based on a direction vector of the at least one calf image to obtain an original image display area corresponding to the at least one calf image; and determining the original image display area as the occlusion area.

8. The method according to claim 7, wherein an initial original image display area corresponding to the first calf image is adjusted by:

identifying a shoe opening rendering area in the initial rendering area; and adjusting the initial original image display area corresponding to the first calf image based on the shoe opening rendering area and a direction vector of the first calf image.

9. The method according to claim 7, the direction vector of the at least one calf image is determined by:

inputting the real image to a pre-established direction determination model to obtain the direction vector corresponding to the at least one calf image; and the direction determination model is established by:

obtaining a training sample set, wherein training samples in the training sample set comprise calf images for training and direction vectors corresponding to the reality images for training; and training a pre-established initial neural network based on the training sample set to obtain the direction determination model.

10. A shoe try-on apparatus based on augmented reality, comprising:

at least one processor; and at least one memory communicatively coupled to the at least one processor and storing instructions that upon execution by the at least one processor cause the apparatus to:

in response to a shoe try-on instruction, collect a real image and display the real image, wherein the real image comprises at least one calf image, and the shoe try-on instruction indicates a shoe mold;

determine an initial rendering area corresponding to a first calf image, wherein the at least one calf image comprises the first calf image;

determine an occlusion area based on the at least one calf image, wherein determining the occlusion area based on the at least one calf image comprises;

adding a calf model corresponding to the at least one calf image in a three-dimension space, and determining the occlusion area based on an occlusion relationship between the shoe mold indicated by the shoe try-on instruction and the added calf model;

determine a target rendering area in the initial rendering area based on the initial rendering area and the occlusion area; and render the target rendering area based on the shoe mold indicated by the shoe try-on instruction to obtain an enhanced shoe mold image, and display the enhanced shoe mold image on the real image.

11. The apparatus of claim 10, the at least one memory further storing instructions that upon execution by the at least one processor cause the apparatus to:

based on a position of the first calf image in the real image, determine a posture of a first calf indicated by the first calf image in a three-dimension space;

based on the posture of the first calf in the three-dimension space, determine a posture of the shoe mold indicated by the shoe try-on instruction in the three-dimension space; and based on the posture of the shoe mold indicated by the shoe try-on instruction in the three-dimension space and a shape of the shoe mold indicated by the shoe try-on instruction, determine the initial rendering area.

12. The apparatus of claim 10, the at least one memory further storing instructions that upon execution by the at least one processor cause the apparatus to:

based on a posture of a calf indicated by the at least one calf image in the three-dimension space, determine a posture of the calf model in the three-dimension space; and based on the determined posture of the calf model in the three-dimension space, add the calf model in the three-dimension space.

13. The apparatus of claim 12, the at least one memory further storing instructions that upon execution by the at least one processor cause the apparatus to:

input the real image to a pre-established annotation model to determine the posture of the calf indicated by the at least one calf image in three-dimensional space;

obtain a training sample set, wherein training samples in the training sample set comprise real images for training and calf postures corresponding to the real images for training, and the real images for training comprises calf images; and train a pre-established initial neural network based on the training sample set to obtain the annotation model.

14. The apparatus of claim 10, the at least one memory further storing instructions that upon execution by the at least one processor cause the apparatus to:

based on a posture of the shoe mold in the three-dimension space, determine a posture of the first calf model corresponding to the first calf image in the three-dimension space; and based on the posture of the first calf model in the three-dimension space, add the first calf model in the three-dimension space.

15. The apparatus of claim 10, the at least one memory further storing instructions that upon execution by the at least one processor cause the apparatus to:

identify the at least one calf image to determine an original image display area corresponding to the at least one calf image; and determine the original image display area as the occlusion area.

16. The apparatus of claim 10, the at least one memory further storing instructions that upon execution by the at least one processor cause the apparatus to:

based on a projection area of a pre-established calf model, obtain an initial original image display area corresponding to the at least one calf image;

adjust the initial original image display area based on a direction vector of the at least one calf image to obtain an original image display area corresponding to the at least one calf image; and determine the original image display area as the occlusion area.

17. A non-transitory computer-readable storage medium, bearing computer-readable instructions that upon execution on a computing device cause the computing device at least to:

in response to a shoe try-on instruction, collect a real image, and display the real image, wherein the real image comprises at least one calf image, and the shoe try-on instruction indicates a shoe mold;

determine an initial rendering area corresponding to a first calf image, wherein the at least one calf image comprises the first calf image;

determine an occlusion area based on the at least one calf image, wherein determining the occlusion area based on the at least one calf image comprises;

adding a calf model corresponding to the at least one calf image in a three-dimension space, and determining the occlusion area based on an occlusion relationship between the shoe mold indicated by the shoe try-on instruction and the added calf model;

determine a target rendering area in the initial rendering area based on the initial rendering area and the occlusion area; and render the target rendering area based on the shoe mold indicated by the shoe try-on instruction to obtain an enhanced shoe mold image, and displaying the enhanced shoe image on the real image.

* * * * *